US00RE36557E

United States Patent [19]

Brown

[11] E Patent Number: Re. 36,557

[45] Reissued Date of Patent: Feb. 8, 2000

[54] FILLER NECK CLOSURE CAP

[75] Inventor: David M. Brown, Oregon, Ill.

[73] Assignee: Stant Manufacturing Inc., Connersville, Ind.

[21] Appl. No.: 08/789,963

[22] Filed: Jan. 31, 1997

Related U.S. Patent Documents

Reissue of:

[64] Patent No.: 5,385,256
Issued: Jan. 31, 1995
Appl. No.: 08/004,686
Filed: Jan. 14, 1993

[51] Int. Cl.[7] ..... B65D 45/28

[52] U.S. Cl. ..... 220/323; 220/315; 220/367.1; 220/DIG. 33

[58] Field of Search ..... 220/231, 307, 220/315, 318, 323, 326, 367.1, DIG. 32, DIG. 33, 86.2, 89.1, 746

[56] References Cited

U.S. PATENT DOCUMENTS

| | | | |
|---|---|---|---|
| 1,340,097 | 5/1920 | Wisegarver | 220/323 X |
| 1,438,376 | 12/1922 | Jeanmaire . | |
| 2,659,514 | 11/1953 | Henderson | 220/323 |
| 2,772,809 | 12/1956 | Ross | 220/323 X |
| 3,006,499 | 10/1961 | Corbett . | |
| 3,074,588 | 1/1963 | Burdue | 220/231 |
| 3,126,728 | 3/1964 | Nehls | 220/315 X |
| 3,186,580 | 6/1965 | Previte | 220/231 X |
| 3,338,455 | 8/1967 | Miller . | |
| 3,477,611 | 11/1969 | Niles . | |
| 3,813,904 | 6/1974 | Wallskog . | |
| 3,820,680 | 6/1974 | Friend . | |
| 3,893,487 | 7/1975 | Engelking . | |
| 3,907,153 | 9/1975 | Mutty . | |
| 4,007,849 | 2/1977 | Hinkle | 220/323 X |
| 4,294,376 | 10/1981 | Keller | 220/318 |
| 4,436,219 | 3/1984 | Reutter . | |
| 4,498,493 | 2/1985 | Harris . | |
| 4,575,136 | 3/1986 | Keller . | |
| 4,676,393 | 6/1987 | Daniel . | |
| 4,690,293 | 9/1987 | Uranishi et al. . | |
| 4,693,389 | 9/1987 | Kalen | 220/236 |
| 4,795,054 | 1/1989 | Brown . | |
| 4,887,733 | 12/1989 | Harris | 220/203 |
| 5,148,938 | 9/1992 | Morgan, Jr. | 220/316 |
| 5,169,015 | 12/1992 | Burke | 220/203 |
| 5,269,431 | 12/1993 | Sakata et al. . | |

FOREIGN PATENT DOCUMENTS

| | | |
|---|---|---|
| 55-134324 | 9/1980 | Japan . |
| 56-147868 | 3/1983 | Japan . |

*Primary Examiner*—Stephen K. Cronin
*Attorney, Agent, or Firm*—Barnes & Thornburg

[57] ABSTRACT

A push-on filler neck cap for a fill passageway of a tank. The cap is provided with a push top and a dependent housing sized to fit within the fill passageway and with a fill passageway seal that is located at the lower inserted end of the housing and wherein the [can] *cap* is also provided with a restraining mechanism located between the push top and the fill passageway [seat] *seal* for securing the cap to the passageway in a sealed manner. The restraining mechanism is defined by a plurality of lugs which: 1) engage into a recess in the fill passageway; 2) pivot outward from the housing to engage the recess in response to movement of a spring biased lever pivotedly mounted to the push top with the recess; and (3) are biased to pivot outwardly for engagement with the recess by a spring located within the housing, which spring also urges the seal into its sealing relationship within the fill passageway.

88 Claims, 6 Drawing Sheets

124
120
122
10
36
38
40
126
40
42
16
128
132
48
46
46
72
50
84
86
54
52
32
136
80
136
32
56
44
78
76
60
26
44
60
56
78
28
28
76
64
82
62
138
62
64
66
61
66
30
138
116
18
30
118
98
58
22
24
20
88
88
12
14
34
93

FILLER NECK CLOSURE CAP

Matter enclosed in heavy brackets [ ] appears in the original patent but forms no part of this reissue specification; matter printed in italics indicates the additions made by reissue.

BACKGROUND AND SUMMARY OF THE INVENTION

This present invention relates to tank filler neck caps and, particularly, to a push-on filler neck cap. More particularly, the present invention relates to a *vehicle* filler neck cap including an attachment mechanism for enabling a user to attach the cap to the filler neck quickly and easily and establish a sealed connection between the cap and the filler neck.

Conventional caps for closing the filler neck of a vehicle fuel tank typically include a closure member for closing the mouth of the filler neck and a handle for turning the closure member to mount the closure member in the filler neck. Partial-turn cam-on caps and multiple-turn threaded caps are well-known types of caps for use in closing filler necks. See, for example, U.S. Pat. Nos. 4,887,733 to Harris and 3,820,680 to Friend. Although turn-to-install caps are currently in widespread use, it would be desirable to provide an alternative cap that is simpler to install on and remove from a filler neck.

More and more vehicle drivers are using the self-service bays at gasoline stations and filling their own fuel tanks. Some people have found that it is difficult to remove and install a conventional partial-turn or multiple-turn filler neck cap during refueling. A cap that is readily installable on and removable from a filler neck by a user without a lot of effort and that is configured to establish a sturdy sealed connection between the cap and the filler neck consistently during use would be a welcomed improvement over conventional caps.

What is needed is a push-on filler neck cap that can be installed easily in the fill passageway of a filler neck. Once installed, a sealed liquid fuel and fuel vapor barrier would be in place near the mouth of the filler neck. Ideally, such a push-on cap would be provided with a cap-release mechanism that is easy to manufacture, assemble, and use.

According to the present invention, a push-on cap is provided for engaging a *vehicle* filler neck. The cap includes a housing sized to fit into a fill passageway in the filler neck and closure means for closing the filler neck. The closure means is coupled to an axially inner end of the housing. The cap further includes means for pushing the housing and closure means as a unit into the fill passageway to seat the closure means on a seal-receiving seat provided in the fill passageway in spaced-apart relation to the open mouth of the filler neck. The pushing means is coupled to the axially outer end of the housing.

The cap further includes means for retaining the housing and the closure means in a filler neck-closing position in the fill passageway during installation of the cap. The retaining means includes at least one retaining lug mounted on the housing for pivotable movement between a projected position fitting into a cap-retention cavity formed in the filler neck and a retracted position away from the cap-retention cavity during movement of the housing into and out of the fill passageway. The retaining means also includes spring means for automatically yieldably biasing each retaining lug toward its projected position so that each retaining lug snaps automatically from its retracted position to its projected position in the cap-retention cavity during push-on installation of the cap on the filler neck. Thus, the housing and closure means are automatically retained in the fill passageway during installation of the cap.

In preferred embodiments, three pivotable retaining lugs are mounted around the circumference of a cylindrically shaped housing. Each retaining lug includes a radially outwardly extending locking arm, a central pivot axis, and a radially inwardly extending toggle arm. Each locking arm is configured to fit into the cap-retention cavity formed in the filler neck upon pivoting movement of the retaining lugs to their projected positions. The toggle arms are used to pivot the retaining lugs about their pivot axes to project the locking arms in radially outward directions into the cap-retention cavity as soon as the cap is pushed far enough into the fill passageway of the filler neck. Illustratively, the filler neck is formed to include a single ring-shaped cap-retention cavity. Alternatively, the filler neck could be formed to include a separate cap-retention cavity for each retaining lug.

A lug actuator is mounted for vertical movement in an interior region of the housing and includes a downwardly opening cup-shaped part. The spring means has an upper end extending into the cup-shaped part of the lug actuator and a lower end acting against the closure means. The lug actuator also includes means around the cup-shaped part for moving the toggle arms of the retaining lugs to pivot the retaining lugs about their pivot axes between their projected and retracted positions. The spring means is positioned to push upwardly against the lug actuator so that it moves the toggle arms automatically to pivot the locking arms into the cap-retention cavity during installation of the cap in the filler neck.

The cap also includes a control mechanism for releasing the retaining means to allow a user to withdraw the cap from the filler neck. Illustratively, the control mechanism includes a vertical stem on the top of the cup-shaped portion of the lug actuator. The housing is formed to include a stem-receiving aperture. The stem moves up and down in that aperture during vertical movement of the lug actuator in the housing. The control mechanism also includes a cap-release lever pivotably mounted to an outer shell coupled to the axially outer end of the housing and a cam on the cap-release lever in engagement with a cam follower on the stem of the lug actuator. This cam mechanism allows a user to move the lug actuator manually so that the retaining lugs are pivoted to their retracted positions whenever the user wishes to remove the cap from the filler neck.

To remove the cap from the filler neck, a user first pivots the cap-release lever from a horizontal cap-retaining position to a vertical cap-releasing position. This movement causes the cam on the cap-release lever to turn and allow the upwardly biased lug actuator to move downwardly in the housing. Such downward movement of the lug actuator automatically pivots each retaining lug to its retracted position to disengage the cap-retaining means in the filler neck. The user is now free to lift on the handgrip provided on the outer shell to withdraw the housing and closure means as a unit from the fill passageway.

Additional objects, features, and advantages of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figure 1:
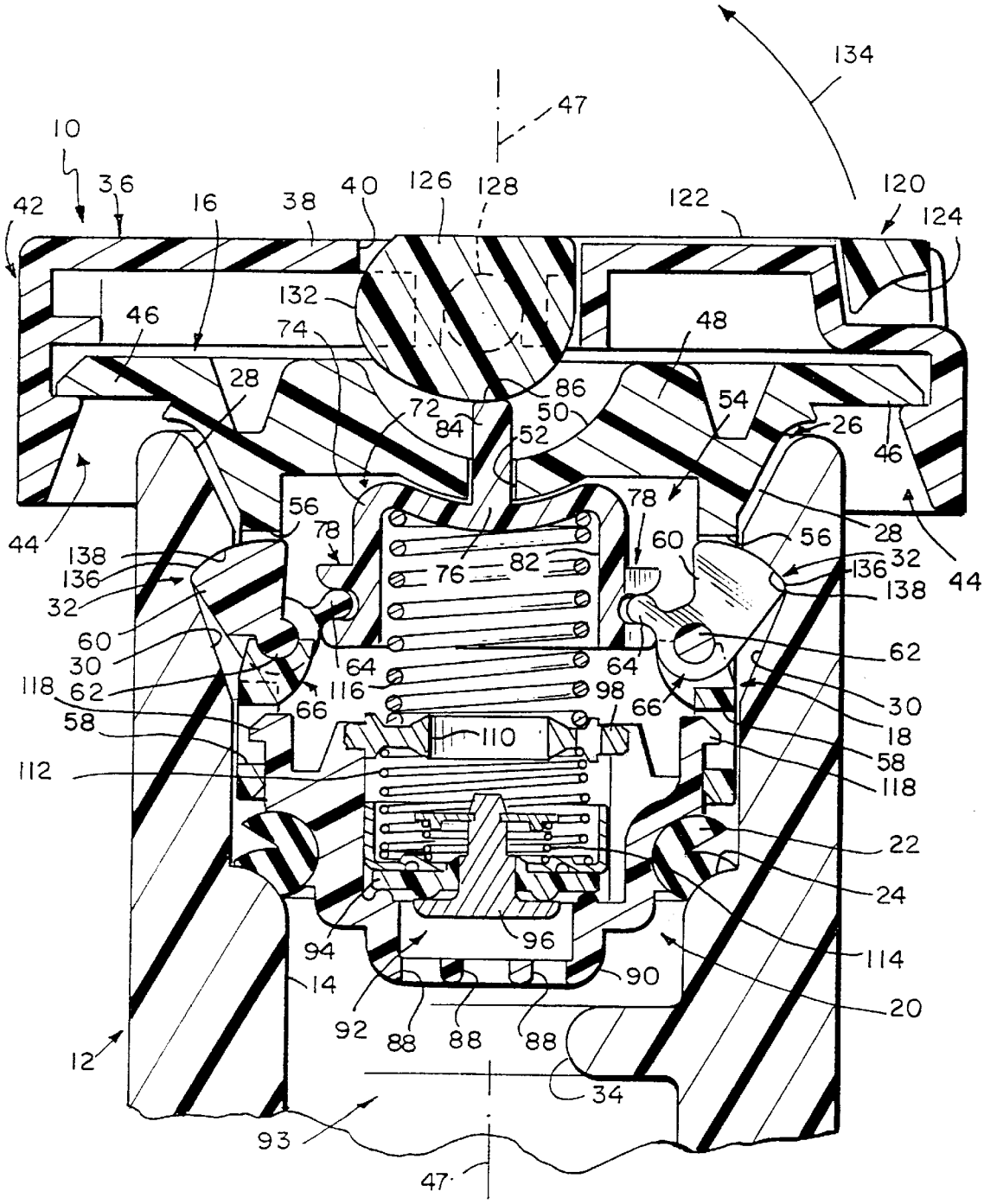
FIG. 1 is a sectional view of a cap according to the present invention showing a housing mounted in a fill passageway of a filler neck and retaining lugs pivotably mounted on the housing and spring-biased to fit into a lug-receiving undercut formed in the filler neck to retain the cap in a sealed fill passageway-closing position in the filler neck.

A push-on cap 10 in accordance with the present invention is mounted in *a vehicle* filler neck 12 to close a fill passageway 14 *defined by an inside wall 11* formed in filler neck 12. Cap 10 includes *a closure 15 having an axially inner end 17, an axially outer end 19, and a side wall 41. The closure 15 is formed for closing the vehicle filler neck 12. Closure 15 includes* an upper housing portion 16, a lower housing portion 18 rigidly connected to upper housing portion 16, *a closure retainer apparatus 21 configured to engage the filler neck 12 when the cap 10 is installed in the filler neck 12 to block removal of the closure 15 from the filler neck 12,* and [a] *an end* closure member 20 coupled to lower housing portion 18 to allow limited relative movement between *the end* closure member 20 and lower housing portion 18. An O-ring sealing gasket 22 is carried on the *end* closure member 20 and configured to seal against *a sealing surface formed by* an annular seal-receiving seat 24 situated to lie in the fill passageway 14 in spaced-apart relation to the open mouth 26 of filler neck 12. *The O-ring sealing gasket 22 is annular in shape and engages the filler neck 12 and the closure 15 so that the sealing gasket is compressed between the closure 15 and the filler neck 12 to sealingly engage the closure 15 and the filler neck 12 and form a seal therebetween. As best shown in FIG. 1, sealing gasket 22 includes a first portion 23 engaging the closure 15 and a second portion 25. The closure member 20 includes a groove 27 that receives the first portion 23 of the sealing gasket 22 therein.*

Figure 8:
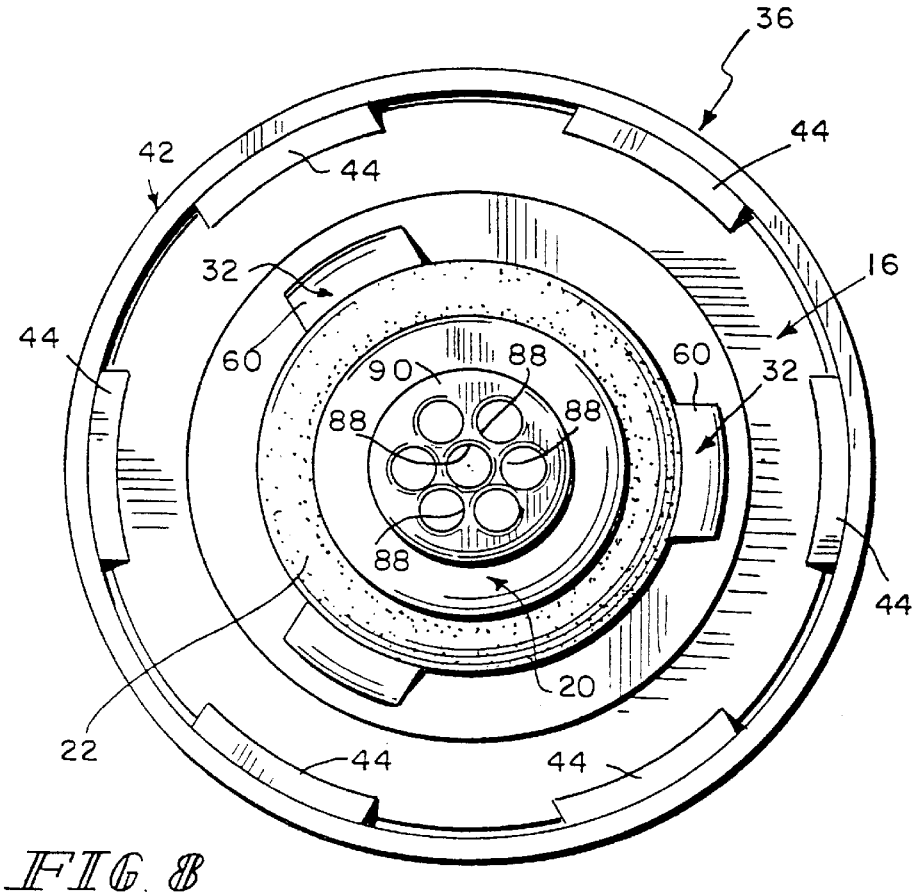
FIG. 8 is a bottom plan view of the cap of FIG. 7 showing the three pivotable retaining lugs uniformly spaced apart about the circumference of the housing and seven inlet apertures into a pressure-relief and vacuum-relief valve assembly mounted in the closure member.

The filler neck 12 is configured to receive and retain the cap 10 in a sealed position closing the fill passageway 14 as shown in FIG. 1. The filler neck 12 is formed to include *a mouth 29,* an axially inwardly diverging conical camming surface 28 [and] a single ring-shaped undercut cap-retention cavity 30. This cavity 30 is configured to open into the fill passageway 14 and lie between the conical camming surface 28 and the radially inwardly projecting seal-receiving seat 24. *Illustratively, the axial distance between the mouth 29 and the seal-receiving seat 24 is a distance X, as shown by line 31. The radial diameter of the inside wall 11 axially inwardly of the cavity 30 and axially outwardly of the seal-receiving seat 24 is a distance Y. Y is about 1.11X and illustrated by line 33. Moreover, as shown in FIG. 1, the axial distance between an outermost portion 35 of the closure retainer apparatus 21 that engages a curved downwardly facing retaining wall 138 and an outermost portion 37 of the second portion 25 is a distance Z. Z is about 0.69X and illustrated by line 39.* The cap-retention cavity 30 is configured in the manner described below to receive *the closure retainer apparatus 21 that comprises* pivotable *ramped* cap-retaining lugs 32 mounted on the lower housing portion 18 and hold the cap 10 in its filler neck-closing position shown in FIG. 1. In another embodiment (not shown), the filler neck 12 is formed to include a separate cap-retention cavity for each cap-retaining lug. The filler neck 12 also includes a reduced-diameter aperture 34 that is positioned in the fill passageway 14 below the seal-receiving seat 24 and sized to receive only a small-diameter nozzle (not shown for dispensing unleaded fuel. The cap 10 further includes an outer shell 36 attached to the axially outer end of the upper housing portion 16. The outer shell 36 includes a top wall 38 formed to include a central slot-like aperture 40 and an annular side wall 42 formed to provide a handgrip. The side wall 42 also includes a plurality of circumferentially spaced-apart tangs 44 that snap onto an upper plate 46 on the upper housing portion 16 to retain the outer shell 36 in place on the upper housing portion 16 as shown in FIGS. 1 and 8. Illustratively, the outer shell 36 is coupled to upper plate 46 to allow for freely spinning movement of the outer shell about vertical axis 47 (FIG. 1) relative to upper housing portion 16.

The upper housing portion 16 includes a central core 48 surrounded by upper plate 46 and formed to include a cam-receiving depression 50 and a stem-receiving aperture 52. The stem-receiving aperture 52 provides a passageway between the cam-receiving depression 50 and an interior region 54 of the housing 16, 18. The upper and lower housing portions 16, 18 cooperate to define three lug-mounting slots 56 that are uniformly spaced apart about the circumference of housing 16, 18 and arranged so that each of the slots 56 confronts the cap-retention cavity 30 formed in the filler neck 12 upon movement of the cap 10 to the filler neck-closing position shown in FIG. 1. The lower housing portion 18 is formed to include arm-receiving channels 58 as shown in FIG. 1 to permit limited movement of closure member 20 relative to lower housing portion 18.

Figure 5:
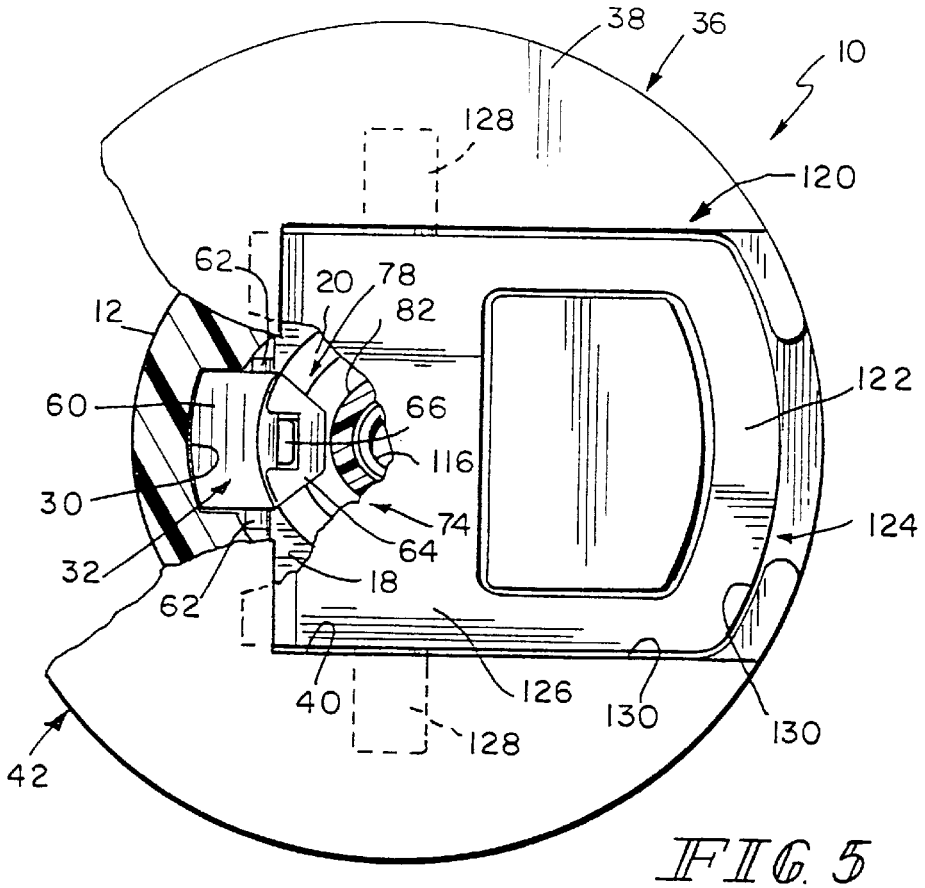
FIG. 5 is a top plan view of the cap of FIG. 1 with portions broken away to show a wide locking arm on one of the retaining lugs in the lug-receiving undercut formed in the filler neck and a narrow toggle lug on that retaining lug in engagement with a movable lug actuator and showing a D-shaped lever pivotably mounted on the cap to control movement of the lug actuator and toggling of the retaining lugs during release of the cap from its sealed filler neck-closing position.
Figure 6:
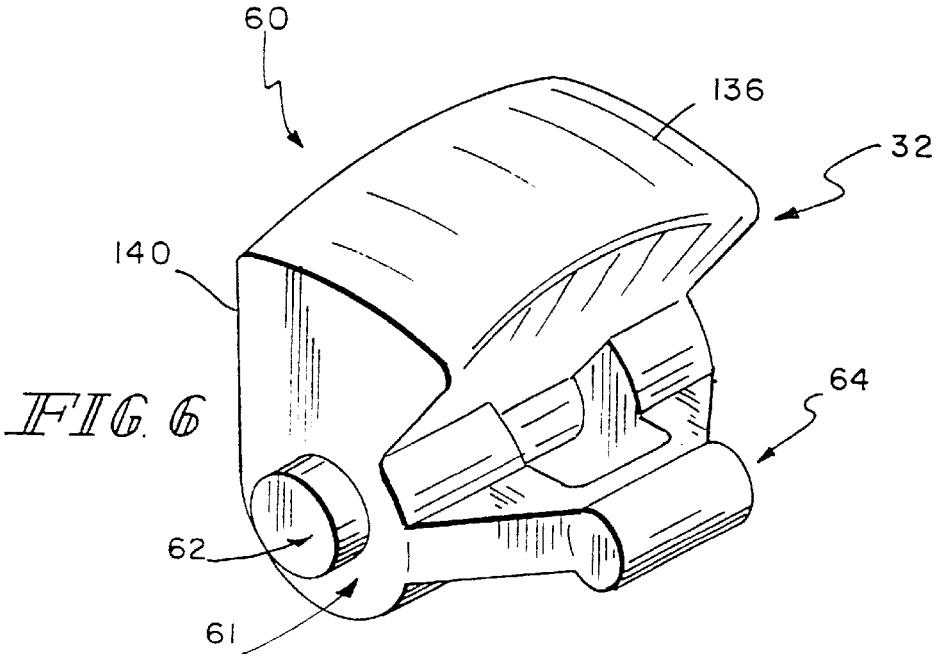
FIG. 6 is a perspective view of a preferred embodiment of the pivotable retaining lug shown in FIG. 5.
Figure 7:
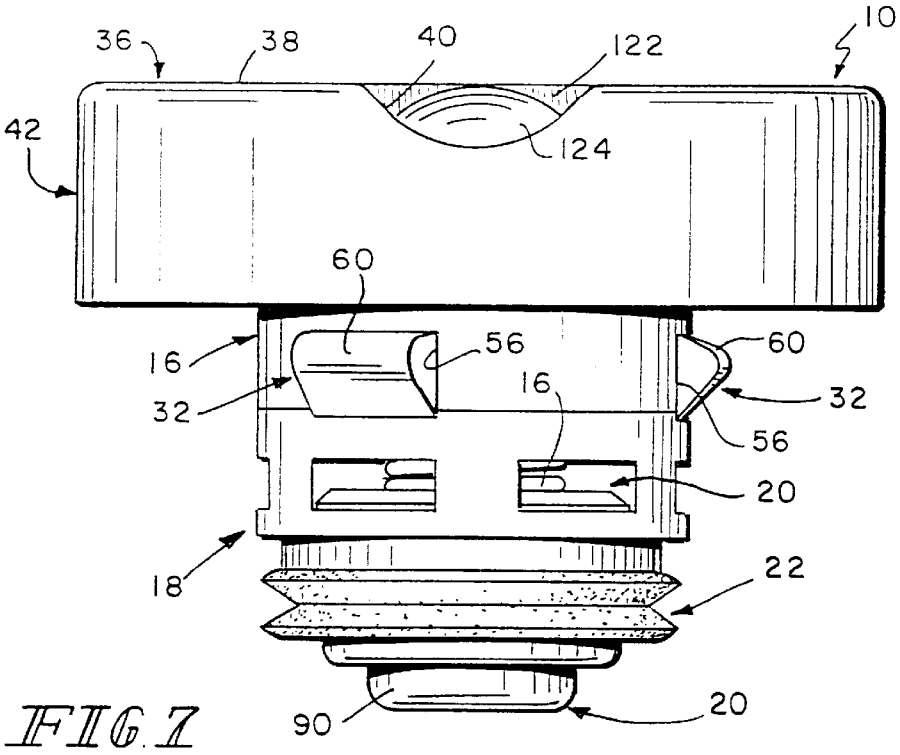
FIG. 7 is a side elevation view of the cap of FIG. 1 showing the handgrip on the outer shell, a two-part housing, two of the pivotable retaining lugs carried on the housing, the lug actuator-biasing spring inside the housing, the closure member, and an O-ring sealing gasket on the closure member.

As shown in FIGS. 1, 5, and 6, each retaining lug 32 includes a wide locking arm 60, a central body 61, pivot axle 62 appended to the central body 61, and a narrow toggle arm 64. Illustratively, each retaining lug 32 is a one-piece molded plastic part as shown in FIG. 6. It will be understood that retaining lug 32 could also be a multi-piece assembly including, for example, a separate pivot axle. The lower housing portion 18 and upper housing portion 16 are formed to include cradle means 66 for supporting and retaining each pivot axle 62 to mount each *ramped* retaining lug 32 in one of the lug-mounting slots 56 formed in the housing 16, 18. Illustratively, nesting cradles are formed in the lower housing portion 18 and axle-retaining fingers are formed in the upper housing portion 16. Each retaining lug 32 is free to pivot about its pivot axle 62 between a radially outwardly extending projected position fitting in the cap-retention cavity 30 as shown, for example, in FIG. 1 and a radially inwardly extending retracted position away from the cap-retention cavity 30 as shown, for example, in FIG. 2.

A lug actuator 72 is positioned in the interior region 54 of housing 16, 18 and allowed to move vertically in the interior region 54 during installation and removal of the cap 10. Lug actuator 72 includes an inverted cup-shaped member 74, an upstanding stem 76, and means 78 for gripping each of the toggle arms 64 as shown in FIG. 1. The cup-shaped member 74 is arranged to open downwardly toward the closure member 20 and includes a concave top wall 80 and a cylindrical side wall 82. The upstanding stem 76 has a foundation end rooted in the concave top wall 80 and a free end 84. The free end 84 is arranged to extend through the stem-receiving aperture 52 formed in the upper housing portion 16 and formed to define a cam follower 86.

A plurality of gripping means 78 are formed in spaced-apart relation about the circumference of the cylindrical side wall 82 of the cup-shaped member 74. [Each] *The gripping means 78 includes a toggle arm seat 61 supporting the toggle arm 64 and a toggle arm cover 63. The toggle arm 64 is sandwiched between the seat 61 and cover 63 so that each* gripping means 78 is configured to move a toggle arm 64 to pivot the locking arm 60 appended to the toggle arm 64 about its pivot axle 62 between its projected and retracted positions. Illustratively, the gripping means 78 are configured to engage and move all of the toggle arms 64 simultaneously so that the retaining lugs 32 can be moved together either in radially outward directions to reach their projected positions or in radially inward directions to reach their retracted positions.

The closure member 20 is formed to include a plurality of inlet openings 88 in a lower end 90 located below O-ring sealing gasket 22 as shown in FIG. 1 so that a pressure-relief and vacuum-relief valve assembly 92 mounted in a cavity formed in the closure member 20 can regulate the pressure in lower portion 93 of fill passageway 14 while the cap 10 is seated in its sealed filler neck-closing position. Valve assembly 92 includes a pressure-relief valve 94, a vacuum-relief valve 96, a support plate 98 appended to closure member 20 and formed to include vent aperture 110, and springs 112, 114 for yieldably biasing the valves 94, 96 to their normally closed positions. Spring 112 engages support plate 98 and pressure-relief valve 94 to bias the pressure-relief valve 94 against an annular valve seat formed on closure member 20. Spring 114 engages a plate attached to vacuum-relief valve 96 and pressure-relief valve 94 to bias the vacuum-relief valve 96 against an annular valve seat formed on the underside of pressure-relief valve 94.

A compression spring 116 is positioned inside the interior region 54 of housing 16, 18 and arranged so that its axially inner end engages support plate 98 and its axially outer end extends into the cup-shaped member 74 of the lug actuator 72. As shown in FIG. 1, the ceiling inside cup-shaped member 74 is dome-shaped to provide a seat for engaging and retaining the axially outer end of the cylindrical compression spring 116. When assembled, the housing 16, 18 and the closure *end* member 20 are held together for limited relative movement therebetween. *The end closure member 20 includes a cup-shaped mouth 51, snap arms 118, and the groove 27 sized to receive the seal 22 therein. The end closure member 20 is movably held on the housing 16, 18* by engagement of snap arms 118 on closure member 20 in the slots 58 formed in the lower housing portion 18. The cap 10 is configured so that the compression spring 116 acts against the support plate 98 to apply a load to the lug actuator 72 that is sufficient to pivot all of the retainer lugs 32 normally to their projected positions.

As shown in FIGS. 1 and 5, a cap-release lever 120 is provided to enable a user to pivot the retaining lugs 32 from their cap-retaining projected positions engaging the filler neck 12 to their cap-releasing retracted positions disengaging the filler neck 12 and thereby begin to remove the cap 10 from the filler neck 12. Cap-release lever 120 includes a D-shaped lever handle 122 having a finger grip 124, a lever body 126, and pivot pins 128. The cap-release lever 120 is mounted to outer shell 36 for pivotable movement between a horizontal cap-retaining position as shown, for example, in FIG. 1 and a vertical cap-releasing position as shown, for example, in FIG. 2. As shown in FIG. 5, the outer shell 36 is formed to include a lever handle-receiving recess 130 to receive the D-shaped lever handle 122 in its horizontal position.

Lever body 126 is formed to include a cam surface 132 arranged to engage the cam follower 86 provided on the free end 84 of the lug actuator stem 76. Compression spring 116 acts against the lug actuator 72 to yieldably load the cam follower 86 against cam surface 132. During pivoting of cap-release lever 120, the cam surface 132 engages the cam follower 86 and imparts movement to the lug actuator 72.

Figure 2:
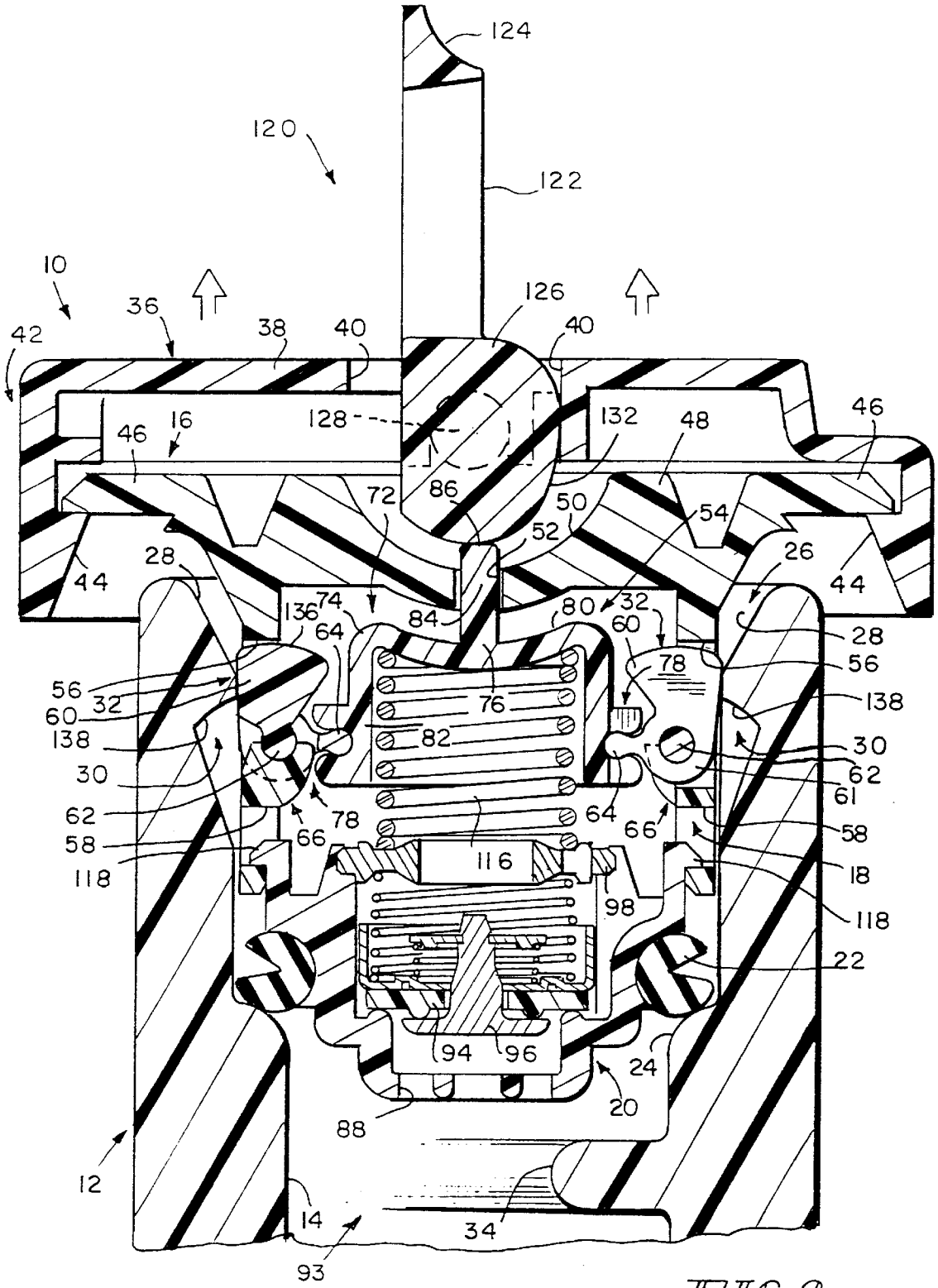
FIG. 2 is a view of the cap of FIG. 1 showing a cap-release lever after it has been pivoted to its vertical position to pivot the retaining lugs out of the undercut to their respective positions and showing an upper portion of the cap after it has been moved upwardly a short distance in the fill passageway away from the underlying closure member and O-ring sealing gasket to raise the retracted retaining lugs above the lug-receiving undercut.
Figure 3:
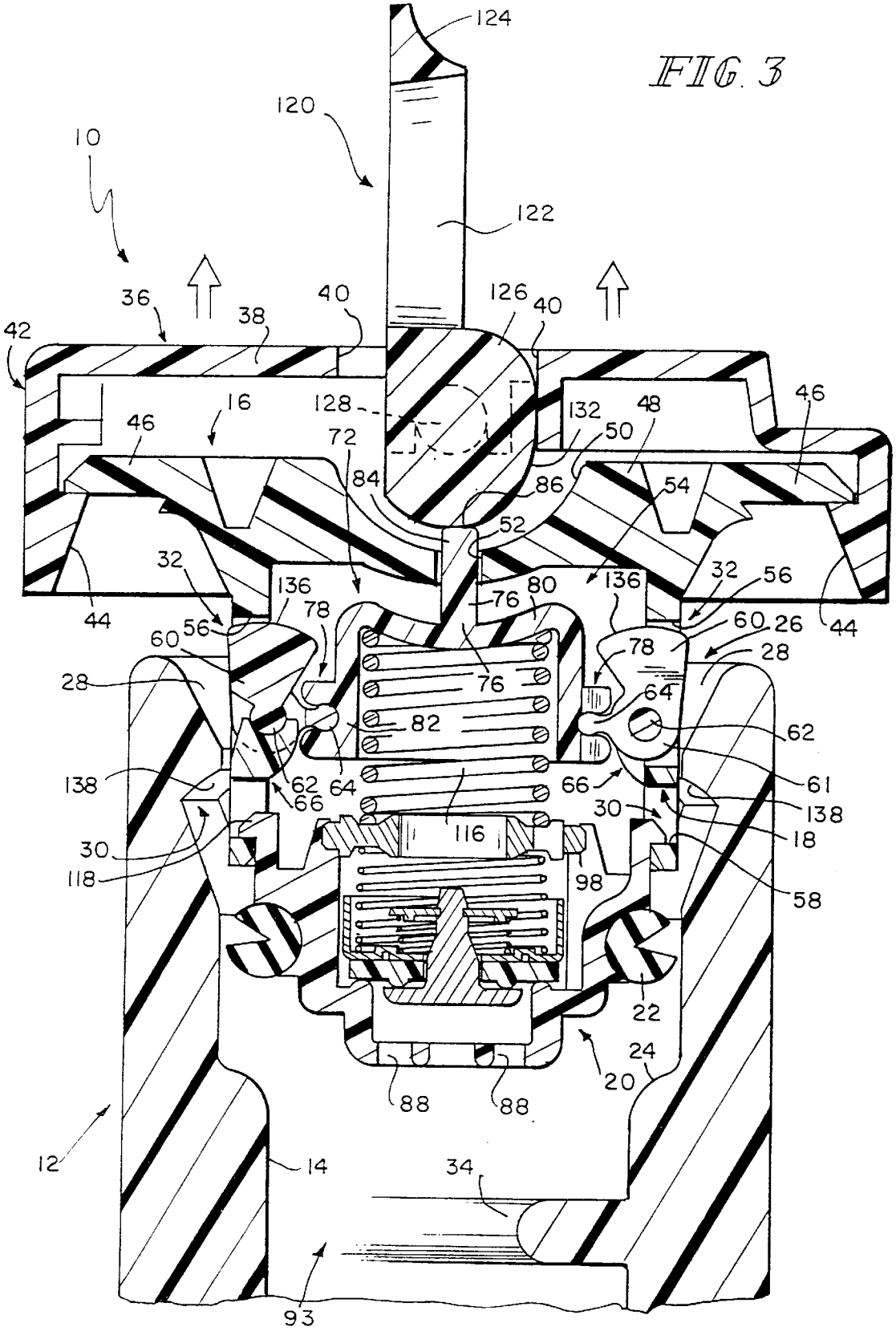
FIG. 3 is a view showing further upward movement of the cap in the fill passageway as it is being manually withdrawn from the filler neck.

In use, the cap 10 is released from its filler neck-closing position in fill passageway 14 by pivoting the cap-release lever 120 in the following manner. The user lifts the finger grip 124 to pivot the lever handle 122 in direction 134 about pivot pins 128 as shown in FIGS. 1 and 2. Pivoting movement of lever handle 122 in direction 134 causes the cam surface 132 to push against the cam follower 86 and drive the lug actuator 72 downwardly inside housing 16, 18. This downward movement of lug actuator 72 compresses preloaded main compression spring 116 further and pivots the toggle-retaining lugs 32 inward and out of the undercut cap-retention cavity 30 formed in the filler neck 12. As soon as the curved top surface 136 of each locking arm 60 disengages [a] *the* curved downwardly facing retaining wall 138 of filler neck 12 in the cap-retention cavity 30, the preloaded main compression spring 116 drives the retaining lugs 32 upwardly past the undercut cap-retention cavities 30 to allow the user to withdraw the cap 10 manually from the filler neck 12 as shown in FIG. 3.

Figure 4:
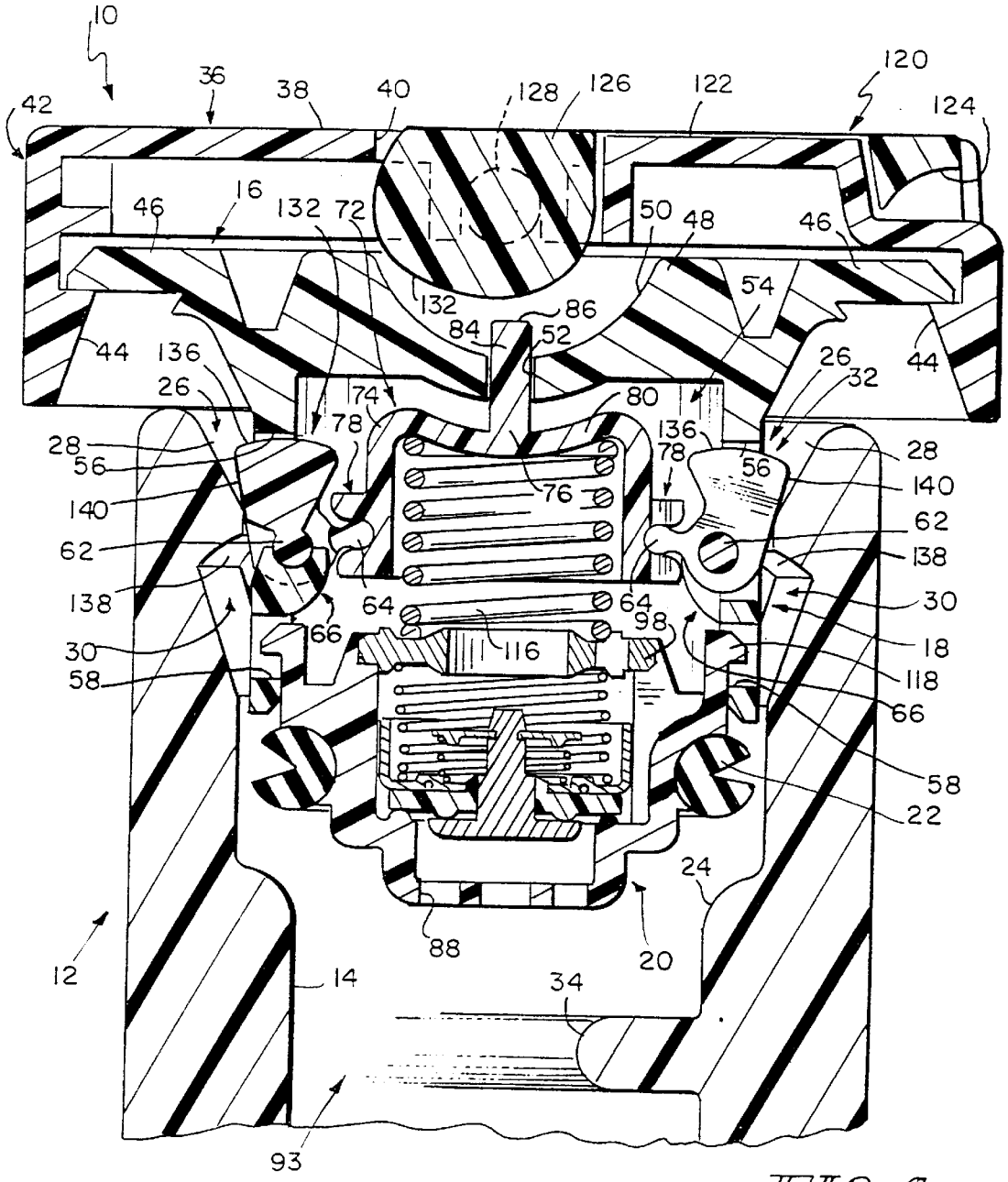
FIG. 4 is a view of cap installation showing movement of the housing and closure member into the fill passageway during installation of the cap on the filler neck and showing pivoting of the retaining lugs in radially inward directions toward their retracted positions upon camming engagement with a conical camming surface located at the mouth of the filler neck.

During installation of cap 10 in filler neck 12, the closure member 20 and housing 16, 18 are inserted as a unit into fill passageway 14 through the filler neck mouth 26 as shown in FIG. 4. If one ring-shaped cap-retention cavity 30 is provided, then the cap 10 can be pushed into fill passageway 14 without first rotating the cap 10 about vertical axis 47 to a predetermined position. However, if a cap-retention cavity is provided for each retaining lug 32, it will be necessary for a user to orient the cap 10 relative to filler neck 12 by rotating the cap 10 about axis 47 to an installation position matching up the position of the retaining lugs 32 to the position of the underlying cap-retention cavities.

The user pushes on the outer shell 36 while the cap-release lever 120 is retained in its horizontal cap-retaining position to move the cap 10 further into fill passageway 14. As shown in FIG. 4, a cam follower 140 on each retaining lug 32 contacts conical camming surface 28 at the open mouth 26 of filler neck 12 to cause the retaining lugs 32 to be pivoted radially inwardly automatically to their retracted positions. As soon as the cap 10 is pushed far enough into fill passageway 14, the spring-loaded retaining lugs 32 pivot radially outwardly to snap automatically into the cap-retention cavity 30. The spring 116 then urges the O-ring sealing gasket 22 into sealing engagement with the seal-receiving seat 24 formed in the filler neck 12 as shown in FIG. 1. Once the fill passageway 14 is closed by closure member 20, excess pressure in lower portion 93 of fill passageway 14 is vented by pressure-relief valve 94 to the atmosphere and vacuum-relief valve 96 vents air into the lower portion 93 to relieve excess vacuum conditions therein.

If the installation stroke is insufficient to latch the toggle-type retaining lugs 32 and the user lets go of the outer shell 36, then the spring-loaded retaining lugs 32 will ordinarily be driven by lug actuator 72 and spring 116 out of fill passageway 14 and into the user's hand. Advantageously, this step provides a signal to the user that the cap 10 did not seat in the filler neck 12 and that it is necessary to once again push the cap 10 into fill passageway 14 until it snaps into its filler neck-closing position.

Although the invention has been described in detail with reference to certain preferred embodiments, variations and modifications exist within the scope and spirit of the invention as described and defined in the following claims.

I claim:

1. A cap for use in a filler neck of a tank, the filler neck being formed to include an outer mouth, a fill passageway communicating with the outer mouth, a cap-retention cavity opening into the fill passageway, and a seal-receiving seat lying in the fill passageway in spaced-apart relation to the outer mouth, the cap comprising a housing sized to fit into the fill passageway, the housing having an axially inner end and an axially outer end, closure means for closing the filler neck, the closure means being coupled to the axially inner end of the housing, means for pushing the housing and closure means into the fill passageway to seat the closure means on the seal-receiving seat, the pushing means being attached to the axially outer end of the housing, and means for retaining the housing and the closure means in a filler neck-closing position in the fill passageway so that the closure means sealingly engages the seal-receiving seat to close the fill passageway, the retaining means including at least one retaining lug, means for pivotably coupling each retaining lug to the housing for pivoting movement between a projected position fitting into the cap-retention cavity and a retracted position lying outside the cap-retention cavity during movement of the housing into and out of the fill passageway, and spring means for yieldably biasing each retaining lug toward its projected position so that it snaps automatically from its retracted position into the cap-retention cavity to retain the housing and closure means in the filler neck-closing position during installation of the cap on the filler neck.

2. The cap of claim 1, wherein the housing is a cylindrical sleeve having an interior region and carrying the [mounting] *retaining* means and the spring means is positioned to extend into the interior region of the cylindrical sleeve.

3. The cap of claim 2, wherein the retaining means includes a plurality of retaining lugs arranged in spaced-apart relation around a circumference of the cylindrical sleeve and in radially outwardly spaced-apart relation to said cylindrical sleeve.

4. The cap of claim 1, wherein the housing is a cylindrical sleeve and the retaining means includes a plurality of retaining lugs arranged in spaced-apart relation about a circumference of the cylindrical sleeve and coupled to the coupling means to pivot in radially inward and outward directions with respect to the cylindrical sleeve during movement of the retaining lugs between the projected and retracted positions and during movement of the housing into and out of the fill passageway.

5. The cap of claim 4, further comprising control means for pivoting the retaining lugs simultaneously in radially inward directions from their projected positions to their retracted positions, the control means being mounted on the axially outer end of the housing.

6. The cap of claim 5, wherein the pushing means includes a handgrip cover mounted on the axially outer end of the housing, the handgrip cover is formed to include an aperture, and the control means extends through the aperture.

7. The cap of claim 5, wherein the control means includes a movable lug actuator in the housing and means for moving the lug actuator in the housing and the lug actuator includes means for engaging the retaining lugs to cause the retaining lugs to pivot in response to movement of the lug actuator in the housing.

8. The cap of claim 4, further comprising a controller, means for mounting the controller on the housing for movement between a cap-retaining position and a cap-releasing position, and means for pivoting the retaining lugs between their projected and retracted positions in response to movement of the controller relative to the housing.

9. The cap of claim 8, wherein the mounting means includes an outer shell coupled to the axially outer end of the housing, the pivoting means includes a movable lug actuator positioned to lie in the housing and configured to engage the retaining lugs, and the controller is a pivotable lever carried on the outer shell and including means for moving the movable lug actuator in the housing to control pivoting movement of the retaining lugs.

10. The cap of claim 8, wherein each retaining lug includes a toggle arm engaging the pivoting means and a locking arm configured to fit into the cap retention cavity, the controller is a lever, the mounting means includes an outer shell coupled to the axially outer end of the housing and means for supporting the lever for pivotable movement relative to the outer shell, and the lever includes a grip handle and cam means for moving the pivoting means relative to the housing against the toggle arms to pivot each retaining lug to move the locking arms into the cap-retention cavity in response to pivoting movement of the lever relative to the outer shell.

11. The cap of claim 8, wherein the spring means engages the closure means and the pivoting means.

12. The cap of claim 1, wherein the closure means includes a closure member, a sealing gasket on the closure member, and means for connecting the closure member to the housing to permit relative movement therebetween in the fill passageway so that the housing is free to move in an axially inward direction into the fill passageway and relative to the closure member upon seating of the sealing gasket on the seal-receiving seat of the filler neck.

13. A cap for use in a filler neck of a tank, the filler neck being formed to include an outer mouth, a fill passageway communicating with the outer mouth, a cap-retention cavity opening into the fill passageway, and a seal-receiving seat lying in the fill passageway in spaced-apart relation to the outer mouth, the cap comprising a housing sized to fit into the fill passageway, the housing having an axially inner end and an axially outer end, closure means for closing the filler neck, the closure means being coupled to the axially inner end of the housing, means for pushing the housing and closure means into the fill passageway to seat the closure means on the seal-receiving seat, the pushing means being coupled to the axially outer end of the housing, and means for retaining the housing and the closure means in a filler neck-closing position in the fill passageway so that the closure means sealingly engages the seal-receiving seat to close the fill passageway, the retaining means including at least one retaining lug, means for mounting each retaining lug to the housing for movement between a projected position fitting into the cap-retention cavity and a retracted position lying outside the cap-retention cavity during movement of the housing into and out of the fill passageway, and spring means for yieldably biasing each retaining lug toward its protected position so that it snaps automatically from its retracted position into the cap-retention cavity to retain the housing and closure means in the filler neck-closing position during installation of the cap on the filler neck, the housing being a cylindrical sleeve having an interior region and carrying the mounting means and the spring means being positioned to extend into the interior region of the cylindrical sleeve, the closure means including a closure member and a sealing gasket on the closure member, the retaining means further including a movable lug actuator coupled to each retaining lug, and the spring means including a compression spring having an axially inner end engaging the closure member and an axially outer end engaging the lug actuator.

14. The cap of claim 13, further comprising control means for moving the lug actuator against the compression spring to move each retaining lug from its projected position to its retracted position to permit withdrawal of the housing and closure means from the fill passageway.

15. The cap of claim 13, wherein the lug actuator is positioned for movement in the interior region of the housing and lies between the pushing means and the compression spring.

16. A cap for use in a filler neck of a tank, the filler neck being formed to include an outer mouth, a fill passageway communicating with the outer mouth, a cap-retention cavity opening into the fill passageway, and a seal-receiving seat lying in the fill passageway in spaced-apart relation to the outer mouth, the cap comprising a housing sized to fit into the fill passageway, the housing having an axially inner end and an axially outer end, closure means for closing the filler neck, the closure means being coupled to the axially inner end of the housing, means for pushing the housing and closure means into the fill passageway to seat the closure means on the seal-receiving [so] *seat,* the pushing means being coupled to the axially outer end of the housing, and means for retaining the housing and the closure means in a filler neck-closing position in the fill passageway so that the closure means sealingly engages the seal-receiving seat to close the fill passageway, the retaining means including at least one retaining lug, means for mounting each retaining lug to the housing for movement between a [protected] *projected* position fitting into the cap-retention cavity and a retracted position lying outside the cap-retention cavity during movement of the housing into and out of the fill passageway, and spring means for yieldably biasing each retaining lug toward its projected position so that it snaps automatically from its retracted position into the cap-retention cavity to retain the housing and closure means in the filler neck-closing position during installation of the cap on the filler neck, the closure means including a closure member, a sealing gasket on the closure member, and means for coupling the closure member to the housing to permit relative movement therebetween in the fill passageway so that the housing is free to move in an axially inward direction into the fill passageway and relative to the closure member upon seating of the sealing gasket on the seal-receiving seat of the filler neck, the retaining means further including a movable lug actuator arranged to lie in the housing and contact each retaining lug, the spring means including a compression spring engaging the closure member and the lug actuator, and the housing including means for moving the lug actuator toward the closure member to compress the compression spring during movement of the housing into the fill passageway and movement of the retaining lugs to their projected positions.

17. The cap of claim 16, further comprising control means for moving the lug actuator against the compression spring to compress the compression spring and pivot the retaining lugs to their retracted positions so that the housing is allowed to move relative to the closure means under a force applied by the compression spring and the housing and closure means are removable from the fill passageway.

18. The cap of claim 16, wherein the lug actuator further includes a cup-shaped member engaging the compression spring and having a cylindrical side wall extending downwardly toward the sealing gasket and a gripping means appended to the cylindrical side wall and the gripping means is configured to engage and move the retaining lugs.

19. A cap for use in a filler neck of a tank, the filler neck being formed to include an outer mouth, a fill passageway communicating with the outer mouth, and a seal-receiving seat lying in the fill passageway in spaced-apart relation to the outer mouth, the cap comprising closure means for closing the filler neck, the closure means including a sealing gasket for abutting the seal-receiving seat without contacting the outer mouth, a housing coupled to the closure means and sized to extend into the fill passageway through the open mouth, means for retaining the housing and the closure means in the fill passageway, the retaining means being mounted on the housing for movement between a filler neck-engaging position and a filler neck-releasing position, control means for moving the retaining means from its filler neck-engaging position to its filler neck-releasing position, and spring means for urging the sealing gasket of the closure means against the seal-receiving seat of the filler neck to establish a seal between the closure means and the filler neck, the spring means engaging the control means and the closure means.

20. The cap of claim 19, wherein the retaining means includes at least one retaining lug and means for pivotably mounting each retaining lug on the housing for pivotable movement about a pivot axis between a filler neck-engaging position and a filler neck-releasing position.

21. The cap of claim 20, wherein the control means includes a lever pivotably mounted on the housing and a movable lug actuator in the housing engaging the at least one retaining lug, and means for moving the lug actuator to pivot the at least one retaining lug in response to pivoting movement of the lever relative to the housing.

22. The cap of claim 20, wherein the housing includes a cylindrical sleeve, the retaining means includes a plurality of retaining lugs arranged in spaced-apart relation about the circumference of the cylindrical sleeve and arranged to pivot in radially inward and outward directions with respect to the cylindrical sleeve, and the control means includes a controller above the housing and a lug actuator positioned to move in the cylindrical sleeve and configured to include means for pivoting the retaining lugs simultaneously in one of the radially inward direction and radially outward direction to move the retaining lugs between their filler neck-engaging and filler neck-releasing positions in response to movement of the controller relative to the housing.

23. The cap of claim 22, wherein the filler neck is formed to include an inner wall defining the fill passageway and cavity means in the inner wall for receiving the retaining lugs upon movement of the retaining lugs in radially outward directions to their filler neck-retaining positions.

24. The cap of claim 22, wherein each retaining lug includes a toggle arm engaging the pivoting means of the actuator and a locking arm configured to engage an undercut cavity formed in the filler neck upon pivoting movement of the retaining lug to its filler neck-engaging position.

25. The cap of claim 22, wherein the controller includes a lever, the housing includes means for mounting the lever to the housing for pivotable movement between a horizontal cap-retaining position and a vertical cap-releasing position, and the lever includes means for moving the lug actuator further into the cylindrical sleeve to pivot the retaining lugs in radially inward directions to their filler neck-releasing positions in response to movement of the lever relative to the housing from its horizontal cap-retaining position to its vertical cap-releasing position.

26. The cap of claim 19, wherein the filler neck is formed to include lug-receiving cavity means for receiving each retaining lug and the control means includes means for pivoting the retaining lugs simultaneously to cause each retaining lug to pivot into the lug-receiving cavity means to establish the filler neck-engaging position and out of the lug-receiving cavity means to establish the filler neck-releasing position.

27. The cap of claim 26, wherein each retaining lug includes a locking arm and a toggle arm, the pivoting means includes a lug actuator coupled to the toggle arms and arranged to slide in opposite directions in an interior region of the housing, and the control means further includes means coupled to the housing for moving the lug actuator in a first direction further into the interior region of the housing to pivot the retaining lugs so that the locking arms of the retaining lugs move out of the lug-receiving cavity means formed in the filler neck and the housing and closure means is removable from the fill passageway.

28. The cap of claim 19, wherein the filler neck includes means for automatically camming the retaining means to its filler neck-releasing position during insertion of the housing and closure means into the fill passageway.

29. The cap of claim 28, wherein the control means includes a movable lug actuator positioned to move in the housing and configured to include means for transmitting a spring force generated by the spring means to the retaining means to yieldably bias the retaining means to its filler neck-engaging position upon disengagement of the retaining means and the camming means.

30. The cap of claim 29, wherein the camming means includes an axially inwardly converging conical surface at the outer mouth of the filler neck, the filler neck is formed to include cavity means for receiving the retaining means in its filler neck-engaging position to lock the housing and closure means in a fixed position closing the fill passageway, the cavity means is located between the axially inwardly converging conical surface and the seal-receiving seat, the retaining means includes at least one retaining lug and means for pivotably mounting each retaining lug on the housing for pivotable movement about a pivot axis, the movable lug actuator includes a cup-shaped member engaging the spring means and means on the cup-shaped member for pivoting each retaining lug about its pivot axis into and out of the cavity means in response to movement of the movable lug actuator in the fill passageway.

31. A cap for use in a filler neck of a tank, the filler neck being formed to include an outer mouth, a fill passageway communicating with the outer mouth, and a seal-receiving seat lying in the fill passageway in spaced-apart relation to the outer mouth, the cap comprising closure means for closing the filler neck, the closure means including a sealing gasket, a housing coupled to the closure means and sized to extend into the fill passageway through the open mouth, means for retaining the housing and the closure means in the fill passageway, the retaining means being mounted on the housing for movement between a filler neck-engaging position and a filler neck-releasing position, control means for moving the retaining means from its filler neck-engaging position to its filler neck-releasing position, and spring means for urging the sealing gasket of the closure means against the seal-receiving seat of the filler neck to establish a seal between the closure means and the filler neck, the spring means engaging the control means and the closure means, the retaining means including at least one retaining lug and means for pivotably mounting each retaining lug on the housing for pivotable movement about a pivot axis between a filler neck-engaging position and a filler neck-releasing position, the control means including a lever pivotably mounted on the housing and a movable lug actuator in the housing engaging the at least one retaining lug, and means for moving the lug actuator to pivot the at least one retaining lug in response to pivoting movement of the lever relative to the housing, each retaining lug including a toggle arm engaging the movable lug actuator and a locking arm configured to engage an undercut cavity formed in the filler neck upon pivoting movement of the retaining lug to its filler neck-engaging position.

32. A cap for use in a filler neck of a tank, the filler neck being formed to include an outer mouth, a fill passageway communicating with the outer mouth, and a seal-receiving seat lying in the fill passageway in spaced-apart relation to the outer mouth, the cap comprising closure means for closing the filler neck, the closure means including a [seal] *sealing* gasket, a housing coupled to the closure means and sized to extend into the fill passageway through the open mouth, means for retaining the housing and the closure means in the fill passageway, the retaining means being mounted on the housing for movement between a filler neck-engaging position and a filler neck-releasing position, control means for moving the retaining means from its filler neck-engaging position to its filler neck-releasing position, spring means for urging the sealing gasket of the closure means against the seal-receiving seat of the filler neck to establish a seal between the closure means and the filler neck, the spring means engaging the control means and the closure means, the filler neck including means for automatically camming the retaining means to its filler neck-releasing position during insertion of the housing and closure means into the fill passageway, and each retaining lug including a radially outwardly facing cam follower surface and the camming means is a conical surface formed in the outer mouth of the filler neck and positioned to engage the radially outwardly facing cam follower surface during insertion of the housing into the fill passageway.

33. A cap for use in a filler neck of a tank, the filler neck being formed to include an outer mouth, a fill passageway communicating with the outer mouth, and a seal-receiving seat lying in the fill passageway in spaced-apart relation to the outer mouth, the cap comprising closure means for closing the filler neck, the closure means including a sealing gasket, a housing coupled to the closure means and sized to extend into the fill passageway through the open mouth, means for retaining the housing and the closure means in the fill passageway, the retaining means being mounted on the housing for movement between a filler neck-engaging position and a filler neck-releasing position, control means for moving the retaining means from its filler neck-engaging position to its filler neck-releasing position, spring means for urging the sealing gasket of the closure means against the seal-receiving seat of the filler neck to establish a seal between the closure means and the filler neck, the spring means engaging the control means and the closure means, the filler neck including means for automatically camming the retaining means to its filler neck-releasing position during insertion of the housing and closure means into the fill passageway, and the [filer] *filler* neck being formed to include cavity means for receiving the retaining means in its filler neck-engaging position and the cavity means being located between the camming means and the seal-receiving seat.

34. The cap of claim 33, wherein the filler neck has a longitudinal axis and includes an axially downwardly facing surface defining an upper wall of the cavity means and the spring means bears on the control means to provide means for urging the retaining means upwardly into engagement with the axially downwardly facing surface.

35. A cap for use in a filler neck of a tank, the filler neck being formed to include an outer mouth, a fill passageway communicating with the outer mouth, and a seal-receiving seat lying in the fill passageway in spaced-apart relation to the outer mouth, the cap comprising closure means for closing the filler neck, the closure means including a sealing gasket, a housing attached to the closure means and sized to extend into the fill passageway through the open mouth, the housing being formed to include an interior region, means for retaining the housing and the closure means in the fill passageway, the retaining means including at least one retaining lug, each retaining lug being coupled to the housing for pivotable movement between a filler neck-engaging position and a filler neck-releasing position, control means for moving the retaining means from its filler neck-engaging position to its filler neck-releasing position, the control means including an actuator movable in the interior region, and spring means for [during] *urging* the sealing gasket of the closure means against the seal-receiving seat of the filler neck to establish a seal between the closure means and the filler neck, the spring means engaging the actuator and the closure means, the actuator including means for engaging each retaining lug, and the control means further including means for moving the actuator in the housing against the spring means to pivot each retaining lug from its filler neck-engaging position to its filler neck-releasing position.

36. The cap of claim 35, wherein the filler neck is formed to include a lug-receiving cavity for receiving each retaining lug and an axially inwardly facing edge bordering the lug-receiving cavity, each retaining lug is sized to fit in the lug-receiving cavity in its filler neck-engaging position, and the spring means acts against the engaging means of the actuator to urge each retaining lug into engagement with the axially inwardly facing edge of the filler neck and against the closure means to urge the sealing gasket against the seal-receiving seat of the filler neck.

37. The cap of claim 36, wherein the moving means includes a lever including a cam and the actuator includes a cam follower in engagement with the cam.

38. The cap of claim 36, wherein the moving means includes a lever and means for mounting the lever to the housing for pivotable movement relative to the housing between a cap-retaining position and a cap-releasing position, the actuator includes a cam follower, and the lever includes cam means for camming the cam follower to move the actuator in the housing and against the spring means so that each retaining lug is pivoted to its filler neck-releasing position upon pivoting of the lever to its cap-releasing position.

39. A cap for use in a filler neck of a tank, the [filer] *filler* neck being formed to include an outer mouth, a fill passageway communicating with the outer mouth, a cap-retention cavity opening into the fill passageway, and a seal-receiving seat lying in the fill passageway in spaced-apart relation to the outer mouth, the cap comprising a housing sized to fit into the fill passageway, the housing having an axially inner end facing into the fill passageway and an axially outer end facing away from the fill passageway, closure means for closing the filler neck, the closure means being coupled to the axially inner end of the housing, means for retaining the housing and the closure means in a filler neck-closing position in the fill passageway so that the closure means sealingly engages the seal-receiving seat to close the fill passageway, and spring means for yieldably biasing the retaining means toward the filler neck-closing position and the spring means including a compression spring having an axially inner end facing into the fill passageway and engaging the closure means and an axially outer end facing away from the fill passageway and engaging the retaining means.

40. The cap of claim 39, further including means for pushing the housing and closure means into the fill passageway to seat the closure means on the seal-receiving seat, the pushing means being coupled to the axially outer end of the housing.

41. The cap of claim 39, wherein the retaining means further includes means for mounting the retaining means to the housing for movement between a projected position fitting into the cap-retention cavity and a retracted position lying outside the cap-retention cavity during movement of the housing into and out of the fill passageway.

42. The cap of claim 41, wherein the retaining means further includes at least one retaining lug, and the spring means biases the at least one retaining lug toward its projected position so that it snaps automatically from its retracting position into the cap-retention cavity to retain the housing and closure means in the filler neck-closing position during installation of the cap in the filler neck.

*43. A cap engageable with a vehicle filler neck of a vehicle fuel tank wherein the vehicle filler neck includes a mouth defining a fill passageway and a sealing surface positioned to lie in the fill passageway spaced apart from the mouth, the cap comprising*

*a closure for closing the vehicle filler neck, the closure sized for insertion into the fill passageway and having an axially inner end, an axially outer end, a side wall, and closure retainer apparatus radially movable relative to the side wall, the closure retainer apparatus being configured to engage the vehicle filler neck when the closure is installed in the vehicle filler neck to block removal of the closure from the vehicle filler neck,*

*a handle coupled to the axially outer end of the closure for moving the closure relative to the vehicle filler neck, and*

*a seal mounted on the closure for sealing engagement with the sealing surface in the vehicle filler neck, the closure retainer apparatus being axially positioned to lie between the seal and the handle.*

*44. The cap of claim 43, wherein the side wall is sized for insertion into the fill passageway and the closure retainer apparatus comprises radially outwardly projecting ramps extending from the side wall.*

*45. The cap of claim 44, wherein the ramps are movable between a vehicle filler neck-engaging position and a vehicle filler neck-disengaging position.*

*46. The cap of claim 44, wherein the closure retainer apparatus is carried by the side wall and the closure further comprises an end closure member movably coupled to the side wall and the seal is carried by the end closure member.*

*47. The cap of claim 46, wherein the end closure member includes an external wall axially movable in the vehicle filler neck relative to the side wall and the seal is mounted on the external wall.*

*48. A cap engageable with a vehicle filler neck of a vehicle fuel tank wherein the vehicle filler neck includes a mouth defining a fill passageway and a sealing surface positioned to lie in the fill passageway spaced apart from the mouth, the cap comprising*

*a closure for closing the vehicle filler neck, the closure sized for insertion into the fill passageway and having an axially inner end, an axially outer end, a side wall sized for insertion into the fill passageway, and closure retainer apparatus configured to engage the vehicle filler neck when the closure is installed in the vehicle filler neck to block removal of the closure from the vehicle filler neck, the closure retainer apparatus including radially outwardly projecting ramps extending from the side wall,*

*a handle coupled to the axially outer end of the closure for moving the closure relative to the vehicle filler neck, and*

*a seal mounted on the closure for sealing engagement with the sealing surface in the vehicle filler neck, the closure retainer apparatus being axially positioned to lie between the seal and the handle, and the side wall is generally cylindrical in shape and the closure retainer apparatus comprises a lug that extends from the cylindrical side wall and is formed for movement between a filler neck-engaging position and a filler neck-disengaging position.*

*49. The cap of claim 48, wherein three lugs are positioned in spaced-apart relation about a circumference of the cylindrical wall.*

*50. A cap engageable with a vehicle filler neck of a vehicle fuel tank wherein the vehicle filler neck includes a mouth defining a fill passageway and a sealing surface positioned to lie in the fill passageway spaced apart from the mouth, the cap comprising*

*a closure for closing the vehicle filler neck, the closure sized for insertion into the fill passageway and having an axially inner end, an axially outer end, closure retainer apparatus configured to engage the vehicle filler neck when the closure is installed in the vehicle filler neck to block removal of the closure from the vehicle filler neck, and a housing that carries the closure retainer apparatus,*

*a handle coupled to the axially outer end of the closure for moving the closure relative to the vehicle filler neck,*

*a seal mounted on the closure for sealing engagement with the sealing surface in the vehicle filler neck, the closure retainer apparatus being axially positioned to lie between the seal and the handle, and*

*an end closure member movably coupled to the housing and carrying the seal.*

*51. A cap engageable with a vehicle filler neck of a vehicle fuel tank wherein the vehicle filler neck includes a mouth defining a fill passageway and a sealing surface positioned to lie in the fill passageway spaced apart from the mouth, the cap comprising*

*a closure for closing the vehicle filler neck, the closure sized for insertion into the fill passageway and having an axially inner end, an axially outer end, and closure retainer apparatus configured to engage the vehicle filler neck when the closure is installed in the vehicle filler neck to block removal of the closure from the vehicle filler neck,*

*a handle coupled to the axially outer end of the closure for moving the closure relative to the vehicle filler neck,*

*a seal mounted on the closure for sealing engagement with the sealing surface in the vehicle filler neck, the closure retainer apparatus being axially positioned to lie between the seal and the handle, and*

*the closure retainer apparatus are mounted for movement relative to the handle, the handle includes a cap-release lever coupled to the closure for pivotable movement between a horizontal cap-retaining position moving the closure retainer apparatus to engage the vehicle filler*

*neck and a vertical cap-releasing position moving the closure retainer apparatus to disengage the vehicle filler neck.*

*52. The cap of claim 51, wherein the handle is formed to include a handle-receiving recess that is sized to receive the cap-release lever therein when the cap-release lever is in the cap-retaining position.*

*53. A vehicle fuel tank closure system comprising*

*a vehicle filler neck having a mouth, an inside wall extending axially inwardly from the mouth internally in the vehicle filler neck and defining a fill passageway for fluid communication with a vehicle fuel tank, the inside wall including a sealing surface positioned to lie in the fill passageway spaced apart from the mouth,*

*a closure for closing the vehicle filler neck, the closure including a housing sized for insertion into the fill passageway and closure retainer apparatus configured to move radially relative to the inside wall to engage the vehicle filler neck when the housing is installed axially into the vehicle filler neck to block removal of the closure from the vehicle filler neck,*

*a handle coupled to the closure for moving the closure relative to the vehicle filler neck, and*

*a seal carried by the closure for sealing engaging the sealing surface of the inside wall to form a seal therebetween to block the escape of liquid fuel and fuel vapor from the fill passageway of the vehicle filler neck, the closure retainer apparatus being axially positioned to lie between the seal and the handle, the inside wall of the vehicle filler neck includes a seal seat that extends into the fill passageway and defines the sealing surface and the seal engages the seal seat as the, closure is moved axially inwardly during installation of the closure into the fill passageway of the vehicle filler neck, and the closure further includes a compressing spring configured to press the seal away from the mouth of the vehicle filler neck and against the seal seat of the vehicle filler neck during installation of the closure in the vehicle filler neck and an end closure member axially movable in the fill passageway relative to the housing, the end closure member includes a cup-shaped mouth having a snap arm and a groove sized to receive the seal therein, the housing interacts with the snap arm and the seal is mounted in the groove.*

*54. A vehicle fuel tank closure system comprising*

*a vehicle filler neck having a mouth, an inside wall extending axially inwardly from the mouth internally in the vehicle filler neck and defining a fill passageway for fluid communication with a vehicle fuel tank, the inside wall including a sealing surface positioned to lie in the fill passageway spaced apart from the mouth,*

*a closure for closing the vehicle filler neck, the closure including a housing sized for insertion into the fill passageway and closure retainer apparatus configured to move radially relative to the inside wall to engage the vehicle filler neck when the housing is installed axially into the vehicle filler neck to block removal of the closure from the vehicle filler neck,*

*a handle coupled to the closure for moving the closure relative to the vehicle filler neck, and*

*a seal carried by the closure for sealingly engaging the sealing surface of the inside wall to form a seal therebetween to block the escape of liquid fuel and fuel vapor from the fill passageway of the vehicle filler neck, the closure retainer apparatus being axially positioned to lie between the seal and the handle, the inside wall of the vehicle filler neck includes a seal seat that extends into the fill passageway and defines the sealing surface and the seal engages the seal seat as the closure is moved axially inwardly during installation of the closure into the fill passageway of the vehicle filler neck, and the closure further includes a compression spring configured to press the seal away from the mouth of the vehicle filler neck and against the seal seat of the vehicle filler neck during installation of the closure in the vehicle filler neck and the housing defines an interior region therein, closure retainer apparatus includes a lug that extends from the housing, and the closure includes an end closure member movably coupled to the housing and carrying the seal thereon.*

*55. The vehicle fuel tank closure system of claim 54, wherein the closure retainer apparatus are mounted for movement relative to the handle and the handle includes a cap-release lever coupled to the closure and formed for pivotable movement relative to the vehicle filler neck between a horizontal cap-retaining position moving the closure retainer apparatus to engage the vehicle filler neck and a vertical cap-releasing position moving the closure retainer apparatus to disengage the vehicle filler neck.*

*56. A vehicle fuel tank closure system comprising*

*a vehicle filler neck having a mouth, an inside wall extending axially inwardly from the mouth internally in the vehicle filler neck and defining a fill passageway for fluid communication with a vehicle fuel tank, the inside wall including a sealing surface positioned to lie in the fill passageway spaced apart from the mouth,*

*a closure for closing the vehicle filler neck, the closure including a housing sized for insertion into the fill passageway and closure retainer apparatus configured to move radially relative to the inside wall to engage the vehicle filler neck when the housing is installed axially into the vehicle filler neck to block removal of the closure from the vehicle filler neck, the closure having an axially inner end and an axially outer end,*

*a handle connected to the axially outer end of the closure for moving the closure relative to the vehicle filler neck, and*

*a seal carried by the closure for sealingly engaging the sealing surface of the inside wall to form a seal therebetween to block the escape of liquid fuel and fuel vapor from the fill passageway of the vehicle filler neck, the closure retainer apparatus being axially positioned to lie between the seal and the handle, and the seal being carried on the closure adjacent to the axially inner end.*

*57. The vehicle fuel tank closure system of claim 56, wherein the seal includes a first portion engaging the vehicle filler neck and a second portion engaging the closure so that the seal is compressed between the closure and the vehicle filler neck.*

*58. The vehicle fuel tank closure system of claim 56, wherein the inside wall of the vehicle filler neck is formed to include a radially inwardly extending seal seat defining the sealing surface and the closure cooperates with the seal seat of the vehicle filler neck to compress the seal as the closure is installed into the fill passageway of the vehicle filler neck.*

*59. The vehicle fuel tank closure system of claim 56, wherein the inside wall of the vehicle filler neck includes a seal seat that extends into the fill passageway and defines the sealing surface and the seal engages the seal seat as the closure is moved axially inwardly during installation of the closure into the fill passageway of the vehicle filler neck.*

*60. The vehicle fuel tank closure system of claim 59, wherein an axial distance between the mouth and the seal*

*seat is a distance X, a radial diameter of the inside wall axially outwardly from the seal seat is a distance Y, and Y is about 1.11X.*

*61. The vehicle fuel tank closure system of claim 59, wherein the closure further comprises a compression spring configured to press the seal away from the mouth of the vehicle filler neck and against the seal seat of the vehicle filler neck during installation of the closure in the vehicle filler neck.*

*62. A vehicle fuel tank closure system comprising*

*a vehicle filler neck having a mouth, an inside wall extending axially inwardly from the mouth internally in the vehicle filler neck and defining a fill passageway for fluid communication with a vehicle fuel tank, the inside wall including a sealing surface positioned to lie in the fill passageway spaced apart from the mouth,*

*a closure for closing the vehicle filler neck, the closure including a housing sized for insertion into the fill passageway and closure retainer apparatus configured to move radially relative to the inside wall to engage the vehicle filler neck when the housing is installed axially into the vehicle filler neck to block removal of the closure from the vehicle filler neck,*

*a handle coupled to the closure for moving the closure relative to the vehicle filler neck, and*

*a seal carried by the closure for sealingly engaging the sealing surface of the inside wall to form a seal therebetween to block the escape of liquid fuel and fuel vapor from the fill passageway of the vehicle filler neck, the closure retainer apparatus being axially positioned to lie between the seal and the handle, and the closure includes an end closure member movably coupled to the housing and the seal is carried by the end closure member.*

*63. A vehicle fuel tank closure system comprising*

*a vehicle filler neck having a mouth, an inside wall extending axially inwardly from the mouth internally in the vehicle filler neck and defining a fill passageway for fluid communication with a vehicle fuel tank, the inside wall including a radially inwardly extending seal seat defining a sealing surface positioned to lie in the fill passageway spaced apart from the mouth,*

*a closure for closing the vehicle filler neck, the closure including a housing sized for insertion into the fill passageway and closure retainer apparatus configured to move radially relative to the inside wall to engage the vehicle filler neck when the housing is installed axially into the vehicle filler neck to block removal of the closure from the vehicle filler neck,*

*a handle coupled to the closure for moving the closure relative to the vehicle filler neck, and*

*a seal carried by the closure for sealingly engaging the sealing surface of the inside wall to form a seal therebetween to block the escape of liquid fuel and fuel vapor from the fill passageway of the vehicle filler neck, the closure retainer apparatus being axially positioned to lie between the seal and the handle, the closure cooperating with the seal seat of the vehicle filler neck to compress the seal as the closure is installed into the fill passageway of the vehicle filler neck, and an axial distance between the mouth and the seal seat is a distance X a radial diameter of the inside wall axially outwardly from the seal seat is a distance Y, and Y is about 1.16X.*

*64. A vehicle fuel tank closure system comprising*

*a vehicle filler neck having a mouth, an inside wall extending axially inwardly from the mouth internally in the vehicle filler neck and defining a fill passageway for fluid communication with a vehicle fuel tank, the inside wall including a radially inwardly extending seal seat defining a sealing surface positioned to lie in the fill passageway spaced apart from the mouth,*

*a closure for closing the vehicle filler neck, the closure including a housing sized for insertion into the fill passageway and closure retainer apparatus configured to move radially relative to the inside wall to engage the vehicle filler neck when the housing is installed axially into the vehicle filler neck to block removal of the closure from the vehicle filler neck,*

*a handle coupled to the closure for moving the closure relative to the vehicle filler neck, and*

*a seal carried by the closure for sealingly engaging the sealing surface of the inside wall to form a seal therebetween to block the escape of liquid fuel and fuel vapor from the fill passageway of the vehicle filler neck, the closure retainer apparatus being axially positioned to lie between the seal and the handle, the closure cooperating with the seal seat of the vehicle filler neck to compress the seal as the closure is installed into the fill passageway of the vehicle filler neck, and an axial distance between an outermost portion of the closure retainer apparatus and an outermost portion of the seal engaging the seal seat is a distance Z and Z is about 1.94X.*

*65. A cap for use in a vehicle filler neck of a vehicle tank, the vehicle filler neck being formed to include an outer mouth, a fill passageway communicating with the outer mouth, a cap-retention cavity opening into the fill passageway, and a seal-receiving seat lying in the fill passageway spaced-apart relation to the outer mouth, the cap comprising*

*a housing sized to fit into the fill passageway, the housing having an axially inner end and an axially outer end,*

*an end closure member movably coupled to the housing adjacent its axially inner end and carrying a seal thereon,*

*a handle for pushing the housing and the end closure member into the fill passageway to seat the seal on the seal-receiving seat, the handle being attached to the housing adjacent the axially outer end thereof, and*

*closure retainer apparatus retaining the housing and the end closure member in a filler neck-closing position in the fill passageway so that the seal sealingly engages the seal-receiving seat to close the fill passageway, the closure retainer apparatus including at least one retaining lug formed for radial movement relative to the cap-retention cavity during movement of the housing into and out of the fill passageway.*

*66. The cap of claim 65, wherein the housing is formed to include arm receiving channels and the end closure member includes a body, snap arms coupled to the body and extending into the arm receiving channels to movably couple the end closure member to the housing and permit relative movement therebetween in the fill passageway so that the housing is free to move in an axially inward direction into the fill passageway and relative to the end closure member upon seating of the seal on the seal-receiving seat of the vehicle filler neck.*

*67. The cap of claim 65, wherein each retaining lug is formed for pivoting movement between a projected position fitting into the cap-retention cavity and a retracted position lying outside the cap-retention cavity during movement of the housing into and out of the fill passageway, and further*

*comprising a spring yieldably biasing each retaining lug toward its projected position so that each lug snaps automatically from its retracted position into the cap-retention cavity to retain the housing and the end closure member in the filler neck-closing position during installation of the cap on the vehicle filler neck.*

*68. The cap of claim 67, wherein the housing is a cylindrical sleeve having an interior region and the spring is positioned to extend into the interior region of the cylindrical sleeve.*

*69. The cap of claim 68, wherein a plurality of retaining lugs are arranged in spaced-apart relation around a circumference of the cylindrical sleeve and in radially outwardly spaced-apart relation to said cylindrical sleeve.*

*70. The cap of claim 65, wherein the housing is a cylindrical sleeve and a plurality of retaining lugs are arranged in spaced-apart relation about a circumference of the cylindrical sleeve and further comprising a retaining lug actuator positioned to lie in the housing and coupled to each of the retaining lugs to move the lugs in radially inward and outward directions with respect to the cylindrical sleeve during movement of the retaining lugs between a projected position fitting into the cap-retention cavity and a retracted position lying outside the cap-retention cavity during movement of the housing into and out of the fill passageway.*

*71. The cap of claim 70, wherein the retaining lug actuator is mounted adjacent the axially outer end of the housing to pivot the retaining lugs simultaneously in radially inward directions from their projected positions to their retracted positions.*

*72. The cap of claim 70, further comprising a controller and wherein the handle is formed to include an aperture and the controller extends through the aperture for engagement with the retaining lug actuator.*

*73. The cap of claim 72, wherein the retaining lug actuator includes an upstanding stem engaging the controller and a toggle arm seat and corresponding cover to fasten the retaining lugs therebetween to cause the retaining lugs to move in response to movement of the retaining lug actuator in the housing.*

*74. The cap of claim 73, wherein the controller is a pivotable lever carried on the handle and the pivotable lever includes a cam engaging the upstanding stem to move the retaining lug actuator in the housing to control movement of the retaining lugs.*

*75. The cap of claim 73, wherein each retaining lug includes a toggle arm fastened between the toggle arm seat and corresponding cover and a locking arm configured to fit into the cap retention cavity, the controller is a lever carried by the handle for pivotable movement relative to the housing, and the lever includes a grip handle and a cam engaging the retaining lug actuator so that the toggle arm seat and corresponding cover moves the toggle arms to pivot each locking arm into the cap-retention cavity in response to pivoting movement of the lever relative to the housing.*

*76. The cap of claim 75, further comprising a spring extending between the end closure member and the retaining lug actuator.*

*77. A cap for use in a vehicle filler neck of a vehicle fuel tank, the vehicle filler neck being formed to include an outer mouth, a fill passageway communicating with the outer mouth, a cap-retention cavity opening into the fill passageway, and a seal-receiving seat lying in the fill passageway in spaced-apart relation to the outer mouth, the cap comprising*

*a housing including a sleeve having an interior region, the sleeve being sized to fit into the fill passageway and having an axially inner end and an axially outer end,*

*an end closure member carrying a seal thereon and being coupled to the axially inner end of the sleeve,*

*a handle being coupled to the axially outer end of the sleeve for pushing the housing and the end closure member into the fill passageway to seat the seal on the seal-receiving seat,*

*closure retainer apparatus for retaining the housing and the end closure member in a filler neck-closing position in the fill passageway so that the seal sealingly engages the seal-receiving seat to close the fill passageway, the closure retainer apparatus including at least one retaining lug mounted to the housing for movement between a projected position fitting into the cap-retention cavity and a retracted position lying outside the cap-retention cavity during movement of the housing into and out of the fill passageway,*

*a movable lug actuator coupled to each retaining lug, and*

*a compression spring positioned to extend into the interior region of the sleeve, the compression spring being configured to yieldably bias each retaining lug toward its projected position so that is snaps automatically from its retracted position into the cap-retention cavity to retain the housing and the end closure member in the filler neck-closing position during installation of the cap on the vehicle filler neck.*

*78. A cap for use in a vehicle filler neck of a vehicle tank, the vehicle filler neck being formed to include an outer mouth, a fill passageway communicating with the outer mouth, a cap-retention cavity opening into the fill passageway, and a seal-receiving seat lying in the fill passageway in spaced-apart relation to the outer mouth, the cap comprising*

*a housing sized to fit into the fill passageway, the housing having an axially inner end and an axially outer end and a central core positioned to lie adjacent the axially outer end,*

*an end closure member including a body, snap arms coupled to the body and movably coupled to the housing to permit relative movement therebetween in the fill passageway so that the housing is free to move in an axially inward direction relative to the end closure member,*

*a seal coupled to the end closure member for sealingly engaging the seal-receiving seat,*

*a handle coupled to the axially outer end of the housing for pushing the housing and the end closure member into the fill passageway to seat the seal on the seal-receiving seat,*

*closure retainer apparatus retaining the housing and the end closure member in a filler neck-closing position in the fill passageway so that the seal sealingly engages the seal-receiving seat to close the fill passageway, the closure retainer apparatus including at least one retaining lug movably mounted to the housing for movement between a projected position fitting in the cap-retention cavity and a retracted position lying outside the cap-retention cavity during movement of the housing into and out of the fill passageway,*

*a movable lug actuator arranged to lie in the housing and contact the retaining lug, and*

*a compression spring positioned to lie in the housing and being configured to yieldably bias the retaining lug toward its projected position so that it snaps automatically from its retracted position into the cap-retention cavity to retain the housing and the end closure member*

*in the filler neck-closing position during installation of the cap on the vehicle filler neck and the central core of the housing being formed press the lug actuator toward the end closure member to compress the compression spring during movement of the housing into the fill passageway and movement of the retaining lug to the projected position.*

*79. The cap of claim 78, further comprising a lever pivotably mounted on the handle and configured to move the lug actuator against the compression spring to compress the compression spring and pivot the retaining lug to the retracted position so that the housing is allowed to move relative to the end closure member under a force applied by the compression spring and the housing and the end closure member are removable from the fill passageway.*

*80. The cap of claim 78, wherein the lug actuator further includes a cup-shaped member engaging the compression spring and having a cylindrical side wall extending downwardly toward the seal and a toggle arm seat and corresponding cover appended to the cylindrical side wall and the toggle arm seat and corresponding cover are configured to engage and move the retaining lug.*

*81. A cap for use in a vehicle filler neck of a vehicle tank, the vehicle filler neck being formed to include an outer mouth, and a seal-receiving seat lying in the fill passageway in spaced-apart relation to the outer mouth, the cap comprising*

*an end closure member including a seal for abutting the seal-receiving seat without contacting the outer mouth and for closing the vehicle filler neck,*

*a housing coupled to the end closure member and sized to extend into the fill passageway through the open mouth,*

*closure retainer apparatus being mounted on the housing for movement between a filler neck-engaging position and a filler neck-releasing position,*

*a controller coupled to the housing, the controller including an actuator positioned to lie in the housing and engaging closure retainer apparatus, the actuator being configured to move closure retainer apparatus from its filler neck-engaging position to its filler neck-releasing position, and*

*a spring engaging the actuator and the end closure member and configured to urge the seal against the seal-receiving seat of the vehicle filler neck to establish a seal between the end closure member and vehicle filler neck.*

*82. The cap of claim 81, wherein closure retainer apparatus includes at least one retaining lug mounted on the housing for pivotable movement about a pivot axis between the filler neck-engaging position and the filler neck-releasing position.*

*83. The cap of claim 81, wherein the vehicle filler neck is formed to include a cavity sized to receive the closure retainer apparatus, the closure retainer apparatus includes a locking arm and a toggle arm, the actuator is coupled to the toggle arm and arranged to slide in opposite directions in an interior region of the housing, and the controller further includes a cam coupled to the housing for moving the actuator in a first direction further into the interior region of the housing to pivot the retaining lug so that the locking arm of the closure retainer apparatus moves out of the cavity formed in the vehicle filler neck and the housing and the end closure member is removable from the fill passageway.*

*84. A cap for use in a vehicle filler neck of a vehicle tank, the vehicle filler neck being formed to include an outer mouth, and a seal-receiving seat lying in the fill passageway in spaced-apart relation to the outer mouth, the cap comprising*

*a housing sized to fit into the fill passageway through the open mouth, the housing including an axially inner end facing into the fill passageway and an axially outer end facing away from the fill passageway,*

*an end closure member for closing the vehicle filler neck, the end closure member being coupled to the axially inner end of the housing and including a seal for abutting the seal-receiving seat,*

*closure retainer apparatus configured to retain the housing and the end closure member in a filer neck-closing position in the fill passageway so that the seal sealingly engages the seal-receiving seat to close the fill passageway, and*

*a compression spring having an axially inner end facing into the fill passageway and engaging the end closure member and an axially outer end facing away from the fill passageway and engaging closure retainer apparatus.*

*85. A cap engageable with a vehicle filler neck of a vehicle fuel tank wherein the vehicle filler neck includes a mouth defining a fill passageway and a sealing surface positioned to lie in the fill passageway spaced apart from the mouth, the cap comprising*

*a closure for closing the vehicle filler neck, the closure being sized for insertion into the fill passageway, the closure having an axially inner end, an axially outer end, a side wall being generally cylindrical in shape and sized for insertion into the fill passageway, and closure retainer apparatus configured to engage the vehicle filler neck when the closure is installed in the vehicle filler neck to block removal of the closure from the vehicle filler neck, the closure retainer apparatus including a lug extending from the cylindrical side wall and being formed for movement between a filler neck-engaging position and a filler neck-disengaging position,*

*a handle coupled to the axially outer end of the closure to move the closure relative to the vehicle filler neck, and*

*a seal mounted on the closure for sealing engagement with the sealing surface in the vehicle filler neck, the closure retainer apparatus being axially positioned to lie between the seal and the handle, the closure retainer apparatus is carried by the cylindrical side wall and the closure further comprises an end closure member movably coupled to the cylindrical side wall and the seal is carried by the end closure member.*

*86. The cap of claim 85, wherein the end closure member includes an external wall axially movable in the vehicle filler neck relative to the cylindrical side wall and the seal is mounted on the external wall.*

*87. The cap of claim 86, wherein three lugs are positioned in spaced-apart relation about a circumference of the cylindrical side wall.*

*88. The cap of claim 87, wherein three lugs are positioned in spaced-apart relation about a circumference of the cylindrical side wall.*

* * * * *